US012583515B2

(12) United States Patent
Pieper et al.

(10) Patent No.: US 12,583,515 B2
(45) Date of Patent: Mar. 24, 2026

(54) ELECTRICALLY OPERABLE AXLE DRIVE TRAIN, METHOD FOR OPERATING AN ELECTRICALLY OPERABLE AXLE DRIVE TRAIN, COMPUTER PROGRAM PRODUCT AND CONTROL UNIT

(71) Applicant: Schaeffler Technologies AG & Co. KG, Herzogenaurach (DE)

(72) Inventors: Torsten Pieper, Weingarten (DE); Marcus Hoppe, Achern (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 193 days.

(21) Appl. No.: 18/568,382

(22) PCT Filed: May 3, 2022

(86) PCT No.: PCT/DE2022/100335
§ 371 (c)(1),
(2) Date: Dec. 8, 2023

(87) PCT Pub. No.: WO2022/262891
PCT Pub. Date: Dec. 22, 2022

(65) Prior Publication Data
US 2024/0270308 A1 Aug. 15, 2024

(30) Foreign Application Priority Data
Jun. 14, 2021 (DE) ..................... 10 2021 115 276.3

(51) Int. Cl.
*B62D 7/00* (2006.01)
*B60K 1/02* (2006.01)
(Continued)

(52) U.S. Cl.
CPC ................ *B62D 7/159* (2013.01); *B60K 1/02* (2013.01); *B60L 3/0061* (2013.01); *B62D 6/002* (2013.01); *B62D 7/1581* (2013.01)

(58) Field of Classification Search
CPC ...... B62D 7/159; B62D 6/002; B62D 7/1581; B62D 7/00; B60K 1/02; B60L 3/0061;
(Continued)

(56) References Cited

U.S. PATENT DOCUMENTS

| 10,759,416 B1 | 9/2020 | Funke et al. | |
| 2013/0253770 A1* | 9/2013 | Nishikawa | B60W 50/023 701/1 |
| 2018/0326835 A1* | 11/2018 | Wolfe | B60K 1/02 |

FOREIGN PATENT DOCUMENTS

| DE | 102010025353 A1 | 12/2011 |
| DE | 102013012124 A1 | 1/2015 |
(Continued)

*Primary Examiner* — Shardul D Patel
(74) *Attorney, Agent, or Firm* — Sulter Swantz IP

(57) ABSTRACT

An electrically operable axle drive train for a motor vehicle, comprising a first vehicle axle having a first electric machine configured to drive a first vehicle wheel of the first vehicle axle, a second electric machine configured to drive a second vehicle wheel of the first vehicle axle, a steering system configured to steer the motor vehicle, and a control unit designed to actuate the steering system. In response to a malfunction of one of the electric machines in which at least one of a lower speed and a lower torque is applied to one of the vehicle wheels than to the other vehicle wheel, the control unit actuates the steering system to a steering position that counteracts a resulting torque that acts on the motor vehicle in response to the malfunction.

20 Claims, 7 Drawing Sheets

(51) Int. Cl.
B60L 3/00 (2019.01)
B62D 6/00 (2006.01)
B62D 7/15 (2006.01)

(58) Field of Classification Search
CPC ......... B60L 2240/421; B60L 2240/423; B60L
15/2036; B60L 2220/42; B60L 2220/46;
B60W 2050/0297; B60W 30/02
USPC ........................................................ 701/22
See application file for complete search history.

(56) References Cited

FOREIGN PATENT DOCUMENTS

| | | | |
|---|---|---|---|
| DE | 102013218919 | A1 | 3/2015 |
| DE | 102018211022 | A1 | 1/2020 |
| DE | 102018124020 | A1 | 4/2020 |
| DE | 102021105796 | A1 | 9/2022 |
| DE | 102021210355 | A1 | 3/2023 |
| JP | 2012176643 | A | 9/2012 |
| JP | 2019187019 | A | 10/2019 |

* cited by examiner

ELECTRICALLY OPERABLE AXLE DRIVE TRAIN, METHOD FOR OPERATING AN ELECTRICALLY OPERABLE AXLE DRIVE TRAIN, COMPUTER PROGRAM PRODUCT AND CONTROL UNIT

CROSS-REFERENCE TO RELATED APPLICATIONS

This application is the U.S. National Phase of PCT Appln. No. PCT/DE2022/100335 filed May 3, 2022, which in turn claims priority to DE 102021115276.3 filed Jun. 14, 2021, the entire disclosures of which are incorporated by reference herein.

TECHNICAL FIELD

The present disclosure relates to an electrically operable axle drive train for a motor vehicle, comprising a first vehicle axle with a first electric machine for driving a first vehicle wheel of the first vehicle axle and at least one second electric machine for driving a second vehicle wheel of the first vehicle axle, as well as a steering system for steering the motor vehicle and a control unit which is designed to effect actuation of the steering system. The disclosure further relates to a method for operating an electrically operable axle drive train, computer program product and control unit.

BACKGROUND

Electric motors are increasingly being used to drive motor vehicles in order to create alternatives to internal combustion engines that require fossil fuels. Significant efforts have already been made to improve the suitability of electric drives for everyday use and also to be able to offer users the driving comfort they are accustomed to.

A detailed description of an electric drive can be found in an article in the German automotive magazine ATZ, volume 113, May 2011, pages 360-365 by Erik Schneider, Frank Fickel, Bernd Cebulski and Jens Liebold entitled: "Hochintegrativ und flexibel—Elektrische Antriebseinheit für E-Fahrzeuge" [Highly Integrative and flexible Electric Drive Unit for Electric Vehicles]. This article describes a drive unit for an axle of a vehicle, which comprises an electric motor that is arranged to be concentric and coaxial with a bevel gear differential, wherein a shiftable 2-speed planetary gear set is arranged in the power train between the electric motor and the bevel gear differential and is also positioned to be coaxial with the electric motor or the bevel gear differential or spur gear differential. The drive unit is very compact and allows for a good compromise between climbing ability, acceleration and energy consumption due to the shiftable 2-speed planetary gear set. Such drive units are also referred to as e-axles or electrically operable drive trains.

Configurations are also known for electric axle drive trains in which each vehicle wheel on an axle is driven by a separate electric motor. The electric motors are then usually connected mechanically in each case to one of the vehicle wheels. A gearbox can be integrated in each case between electric motor and vehicle wheel. Therefore, in such configurations there is usually no possibility for one of the motors to drive both vehicle wheels. For example, there is no differential gear to which both wheels are connected. This results in the problem that if one of the two motors fails, a one-sided introduction of force occurs, resulting in a torque that could cause the vehicle to rotate about the vehicle's vertical axis. The torque is based on the driving force in tire-to-road contact and the lever arm to the vehicle's center of gravity, which corresponds to approximately half the track width.

This torque may cause the vehicle to swerve in a manner not expected by the driver and requires quick and correct driver intervention. It is clear that such an operating situation poses a high risk of human error.

SUMMARY

The present disclosure, according to an exemplary embodiment, provides an electrically operable axle drive train that provides a high level of safety in the control of the vehicle in the event of an electric machine failure, which reduces or eliminates the risks described above. The present disclosure further provides an improved method for controlling an electrically operable axle drive train.

An electrically operable axle drive train for a motor vehicle, comprises a first vehicle axle with a first electric machine for driving a first vehicle wheel of the first vehicle axle and at least one second electric machine for driving a second vehicle wheel of the first vehicle axle, as well as a steering system for steering the motor vehicle and a control unit which is designed to actuate the steering system, wherein in the event of a malfunction of one of the electric machines of the electrically operable axle drive train, in which a lower speed and/or a lower torque is applied to one of the vehicle wheels than to the respective other vehicle wheel, a resulting torque acting on the motor vehicle is generated, which is compensated for by a steering position of the steering system that counteracts this torque and is actuated by the control unit.

A significant advantage of the axle drive train according to the present disclosure is that control engineering methods can be implemented to keep the motor vehicle safely and controllably on track in the event of an electric machine failure while using only existing components of the steering system or the chassis for this purpose. Since the motor vehicle "knowingly" goes into emergency operation, in which the drive torque on the remaining driven vehicle wheel is also known, the control unit can initiate the corresponding countermeasures via the steering system and/or the chassis early, safely and maximally conveniently, without manual intervention by the driver being required.

An electric axle drive train of a motor vehicle may comprise at least one electric machine and at least one gear assembly, wherein the electric machine and the gear assembly may in each case form a structural unit. The electric axle drive train may have a first electric machine with a first gear assembly and a second electric machine with a second gear assembly.

It can in particular be provided for an electric machine and a gear assembly in each case to be arranged in a common drive train housing. Alternatively, it would of course also be possible for the electric machine to have a motor housing and the gearing to have a gear housing, wherein the structural unit can then be brought about by fixing the gear assembly in relation to the electric machine. This structural unit is sometimes also referred to as an e-axle.

The electric machines and gear assemblies may also be housed in each case or jointly in a drive train housing. The drive train housing is provided at least to accommodate the electric machine and the gear assembly. The drive train housing may be formed from a metallic material, e.g., from aluminum, gray cast iron or cast steel, in particular by means of a primary shaping process such as casting or die-casting.

In principle, however, it would also be possible to form the drive train housing from a plastics material.

The drive train housing may have a cup-like basic shape, such that the electric machine and the gearing can be inserted into the drive train housing via the open end face thereof.

An electric machine serves to convert electrical energy into mechanical energy and/or vice versa, and generally comprises a stationary part referred to as a stator or armature, and a part referred to as a rotor arranged to be movable relative to the stationary part.

In the case of electric machines designed as rotary machines, a distinction is drawn in particular between radial flux machines and axial flux machines. A radial flux machine is characterized in that the magnetic field lines extend in the radial direction in the air gap formed between rotor and stator, while in the case of an axial flux machine the magnetic field lines extend in the axial direction in the air gap formed between rotor and stator.

In the context of the present disclosure, the electric machine can be configured as a radial or axial flux machine. To form an axially particularly compact axle drive train, preference should be given to axial flux machines.

The electric machine is intended in particular for use within an electrically operable drive train of a motor vehicle.

In particular, the electric machine is dimensioned such that vehicle speeds of more than 50 km/h, preferably more than 80 km/h and in particular more than 100 km/h can be achieved. The electric motor may have an output of more than 30 KW, preferably more than 50 KW and in particular more than 70 KW. Furthermore, the electric machine may provide speeds greater than 5,000 rpm, particularly preferably greater than 10,000 rpm, very particularly preferably greater than 12,500 rpm.

The gear assembly of the electric axle drive train is, in particular, couplable to the electric machine, which is designed to generate a drive torque for the motor vehicle. The drive torque may be a main drive torque, such that the motor vehicle is driven exclusively by the drive torque.

The gear assembly may comprise differential gearing. Differential gearing is planetary gearing with one input and two outputs. It usually has the function of driving two vehicle wheels of a motor vehicle in such a way that they can turn at different speeds when cornering, but with the same tractive power.

The steering system can be designed as a steer-by-wire steering system. A steer-by-wire steering system within the meaning of the present disclosure is to be understood as meaning a steering system for the front axle which consists substantially of what is termed a hand wheel actuator (HWA), for example the actuator system around the commanding vehicle steering wheel, and a road wheel actuator (RWA), i.e., the actuator system acting on the steering mechanism connected to the vehicle wheels. The steering signal is here transmitted from the HWA to the RWA "by wire."

A control unit, as used in the present disclosure, serves in particular in open- and/or closed-loop electronic control of one or more technical systems of a motor vehicle. In particular, a control unit can be provided for open- and/or closed-loop control of one or more electric machines and/or a steering system.

A control unit has, in particular, a wired or wireless signal input for receiving in particular electrical signals, such as sensor signals for example. Furthermore, a control unit likewise may have a wired or wireless signal output for the transmission of, in particular, electrical signals, for example to electrical actuators or electrical consumers of the motor vehicle.

Open-loop control operations and/or closed-loop control operations can be carried out within the control unit. The control unit may comprise hardware that is designed to run software. The control unit may comprise at least one electronic processor for executing program sequences defined in software.

The control unit can also have one or more electronic memories in which the data contained in the signals transmitted to the control unit can be stored and read out again. Furthermore, the control unit can have one or more electronic memories in which data can be stored in a modifiable and/or non-modifiable manner.

A control unit can comprise a plurality of control devices which are arranged in particular spatially separate from one another in the motor vehicle. Control devices are also referred to as electronic control units (ECU) or electronic control modules (ECM) and may have electronic microcontrollers for carrying out computing operations for processing data, particularly preferably using software. The control devices can be networked with one another such that wired and/or wireless data exchange between control devices is made possible. In particular, it is also possible to network the control devices with one another via bus systems present in the motor vehicle, such as a CAN bus or LIN bus for example.

According to one advantageous embodiment of the present disclosure, it can be provided that the control unit actuates the steering system in such a way that a third vehicle wheel and/or a fourth vehicle wheel of a second vehicle axle can be moved into a steering position that compensates for the torque. According to a further embodiments of the present disclosure, it can also be provided that the control unit actuates the steering system in such a way that the first vehicle wheel and/or the second vehicle wheel of the first vehicle axle can be moved into a steering position that compensates for the torque. For example, it is possible in this way for the steering system to influence front axle steering and/or rear wheel steering.

Furthermore, according to an embodiment of the present disclosure, it can be provided that the control unit actuates the steering system in such a way that the third vehicle wheel and/or the fourth vehicle wheel of the second vehicle axle can be moved into a steering position that compensates for the torque in that, in the steering position, the camber angle of the third vehicle wheel and/or the fourth vehicle wheel is brought into a camber angle position that counteracts the torque. The advantage of this configuration is that the chassis of the steering system is acted upon without, for example, the steering angle of the chassis or of the steering system having to be modified.

According to a further embodiment of the present disclosure, it can be provided that the control unit actuates the steering system in such a way that the third vehicle wheel and/or the fourth vehicle wheel of the second vehicle axle can be moved into a steering position that compensates for the torque in that, in the steering position, the toe-in angle of the third vehicle wheel and/or the fourth vehicle wheel is brought into a toe-in angle position that counteracts the torque.

Furthermore, the present disclosure can also be further developed in such a way that the control unit is designed, in the event of a malfunction of one of the electric machines of the electrically operable axle drive train, to generate a signal representing the malfunction and send it to a higher-level control unit of the motor vehicle and/or signal receiver outside the motor vehicle.

In an embodiment of the present disclosure, it can also be provided that the control unit is designed, in the event of a malfunction of one of the electric machines of the electrically operable axle drive train, to store the time when the malfunction occurred in the control unit and/or a higher-level control unit, and/or to send it to a signal receiver outside the motor vehicle.

The present disclosure further provides a method for operating an electrically operable axle drive train for a motor vehicle comprising a first vehicle axle with a first electric machine for driving a first vehicle wheel of the first vehicle axle and at least one second electric machine for driving a second vehicle wheel of the first vehicle axle, as well as a steering system for steering the motor vehicle and a control unit which is designed to effect actuation of the steering system, comprising the following steps:

monitoring the function of the electric machines, and
checking whether there is a malfunction in one of the electric machines, in which one of the vehicle wheels has a lower speed and/or a lower torque than the respective other vehicle wheel, such that a resulting torque acting on the motor vehicle is generated,
calculating, by the control unit, a steering position of the steering system that counteracts this torque,
actuating the steering system into the calculated steering position that counteracts the torque.

The present disclosure further provides a computer program product stored on a machine-readable medium, or a computer data signal made manifest by an electromagnetic wave, with program code suitable for carrying out the above method.

Finally, the present disclosure further provides a control unit for controlling an electrically operable axle drive train for a motor vehicle, comprising a processor and a memory containing a computer program code, wherein the memory and the computer program code are configured, with the processor, to cause the control unit to carry out the above method.

BRIEF DESCRIPTION OF THE DRAWINGS

The present disclosure will be explained in more detail below with reference to figures without limiting the general concept of the present disclosure.

In the figures.

DETAILED DESCRIPTION

Figure 1:
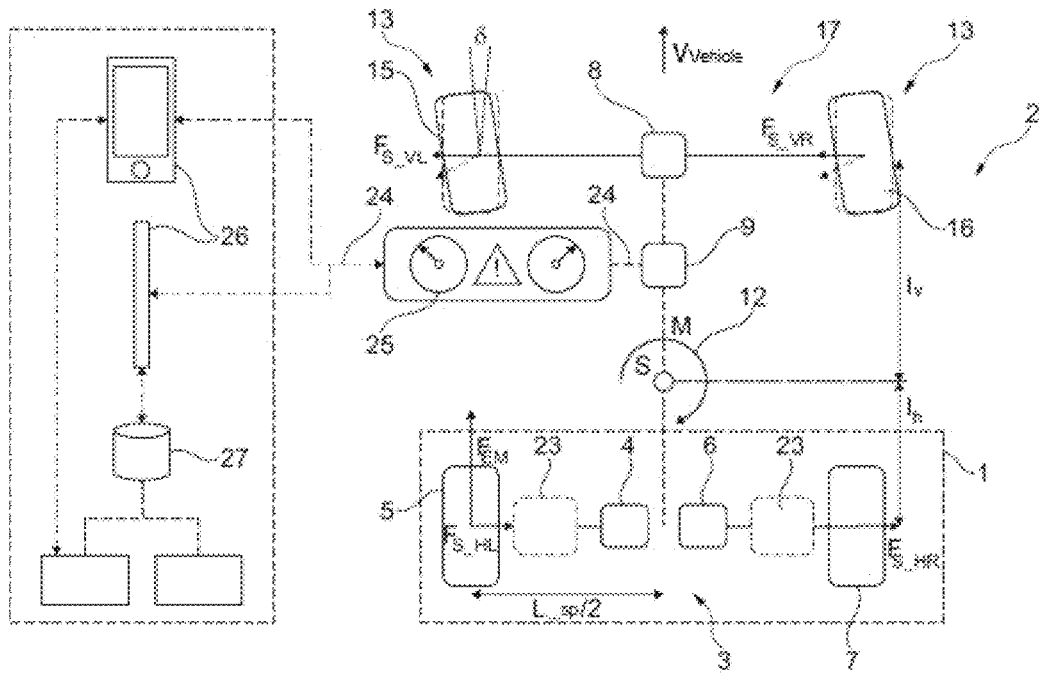
FIG. 1 shows a first embodiment of an electrically operable axle drive train in a schematic block diagram.

Various exemplary embodiments and solution approaches, which can be used individually or in combination, are shown below in FIGS. 1-6. In all of the following exemplary embodiments, the drive of the vehicle 2 is located on the left rear wheel, the first electric machine 4 thus driving the first vehicle wheel 5, this also being indicated in the figures by the corresponding arrow FEM extending vertically in the image plane. This serves merely for linguistic simplification and also applies mutatis mutandis to the case of the drive on the right rear wheel 7 or on one of the front wheels 15,16.

FIG. 1 shows an electrically operable axle drive train 1 for a motor vehicle 2 comprising a first vehicle axle 3 with a first electric machine 4 for driving a first vehicle wheel 5 of the first vehicle axle 3 and at least one second electric machine 6 for driving a second vehicle wheel 7 of the first vehicle axle 3. Gearing 23, which can in particular be designed as planetary gearing, is arranged in each case in the torque flow between the electrical machines 4, 6 and the respective vehicle wheels 5, 7. The electrically operable axle drive train 1 is coupled to a steering system 8 for steering the motor vehicle 2 and has a control unit 9 which is designed to actuate the steering system 8.

In the event of a malfunction of one of the electric machines 4, 6 of the electrically operable axle drive train 1, in which a lower speed and/or a lower torque is applied to one of the vehicle wheels 5 than to the respective other vehicle wheel 7, a resulting torque 12 acting on the motor vehicle 2 is generated, which is compensated for by a steering position 13 of the steering system 8 that counteracts this torque 12 and is actuated by the control unit 9. In the figures, the second electric machine 6 exhibits a malfunction and does not provide the vehicle wheel 7 with any torque.

FIG. 1 shows that the control unit 9 actuates the steering system 8 in a first embodiment in such a way that a third vehicle wheel 15 and a fourth vehicle wheel 16 of a second vehicle axle 17 can be moved into a steering position 13 which compensates for the torque 12. In the embodiment of FIG. 1, this is shown for a motor vehicle 2 with a superimposed steering system or steer-by-wire system or for a self-driving vehicle. The torque 12 generated by the unilateral drive on the first vehicle axle 3 acts on the motor vehicle 2 in a clockwise direction in the embodiments shown. In order to generate a counter-torque, in the exemplary embodiment in FIG. 1 the front wheels can be turned by a small angle to the left. Due to the increased cornering forces of the tires and the lever arm relative to the center of gravity, a torque is created that counteracts that of the driven wheel.

FIG. 1 also shows that the control unit 9 is designed, in the event of a malfunction of one of the electrical machines 4, 6 of the electrically operable axle drive train 1, to generate a signal 24 representing the malfunction and to send it to a higher-level control unit 25 of the motor vehicle 2 and/or a signal receiver 26 outside the motor vehicle 2.

The signal receiver 26 is arranged outside the motor vehicle 2 in the exemplary embodiment shown. For example, the signal receiver 26 can be a smartphone and/or a server 27 that can be contacted via a wireless connection, these being designed in each case to process the signal 24. What can also be seen from FIG. 1 is that the control unit 9 is set up, in the event of a malfunction of one of the electric machines 4, 6 of the electrically operable axle drive train 1, to store the time at which the malfunction occurs in the control unit 9 and/or a higher-level control unit 25 and/or to send it to a signal receiver 26 outside the motor vehicle 2.

With this system architecture, a very wide variety of value-added services can then be implemented, some of which are explained in more detail below by way of example.

For example, the signal 24 could conceivably be used to determine the closest suitable workshop and to transmit to the workshop information about the malfunction that has occurred, vehicle type, etc. and to display the fastest route to the workshop in the navigation device of the vehicle 2.

It would also be possible to use the signal 24 to inform a defined group of recipients by smartphone about the malfunction, for example a group of recipients related to an appointment in the driver's digital calendar, so that they are informed about possible delays by way of precaution.

Of course, the signal 24 can also be used to visually and/or acoustically and/or haptically indicate to the driver a warning signal that one of the electric machines 4, 6 is malfunctioning, as indicated in FIG. 1 by the warning triangle in the control unit 25.

Finally, the signal 24 can also cause speed limitation and/or power reduction of the motor vehicle 2 by the control unit 9 and/or the higher-level control unit 25 in order to increase driving safety in the event of a fault in one of the driving electric machines.

In contrast to FIG. 1, turning just one of the two front wheels or the rear wheels and combining the measures would also be conceivable. A combination would also distribute the additional load across the tires. These exemplary embodiments are shown in subsequent FIGS. 2-4 and are briefly explained in more detail.

Figure 2:
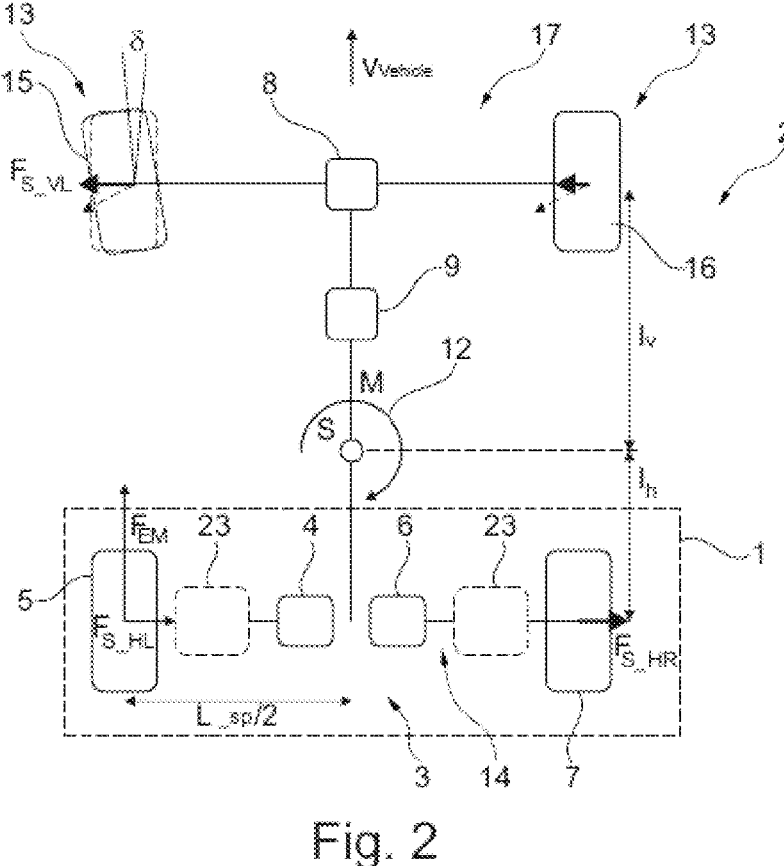
FIG. 2 shows a second embodiment of an electrically operable axle drive train in a schematic block diagram.

FIG. 2, for example, shows that the control unit 9 actuates the steering system 8 in such a way that only a third vehicle wheel 15 of a second vehicle axle 17 can be moved into a steering position 13 that compensates for the torque 12.

Figure 3:
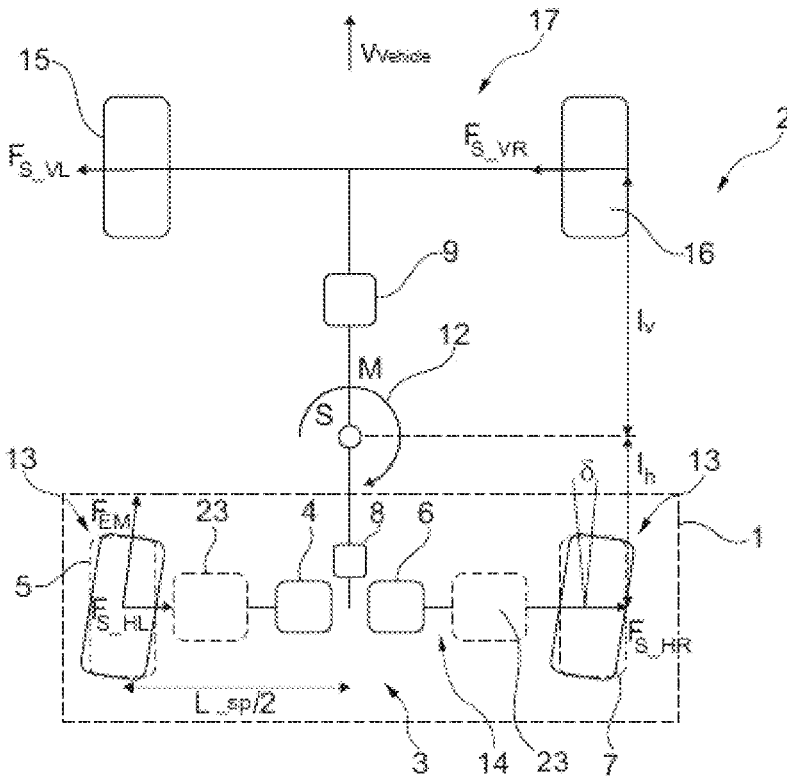
FIG. 3 shows a third embodiment of an electrically operable axle drive train in a schematic block diagram.

FIG. 3 shows an embodiment with rear axle steering, in which the control unit 9 actuates the steering system 8 in such a way that the first vehicle wheel 5 and the second vehicle wheel 7 of the first vehicle axle 3 can be moved into a steering position 13 which compensates for the torque 12.

Figure 4:
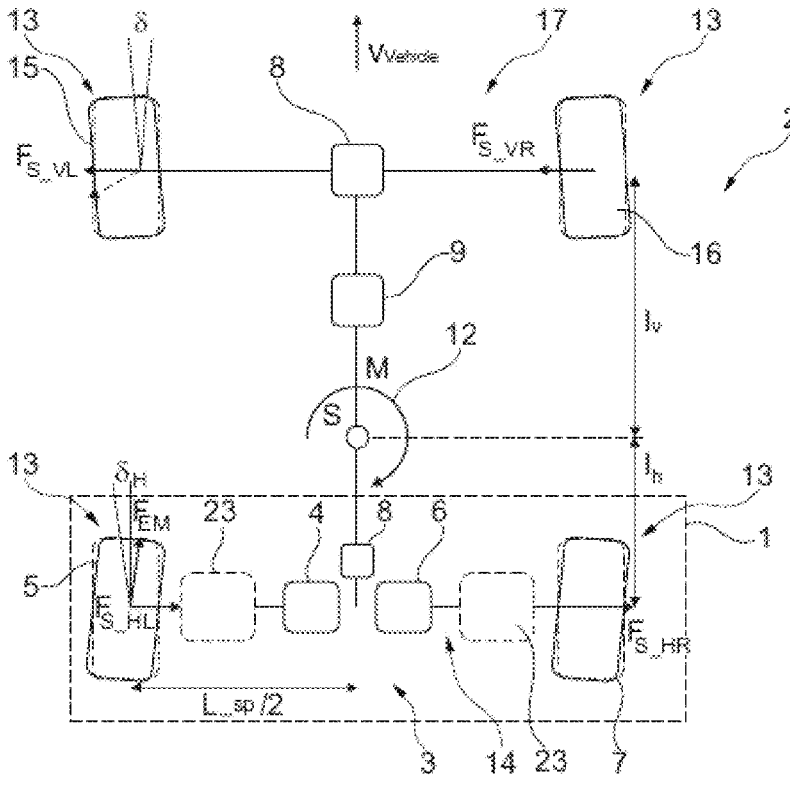
FIG. 4 shows a fourth embodiment of an electrically operable axle drive train in a schematic block diagram.

A combination of the previously described rear axle and front axle steering systems is shown in FIG. 4.

Figure 5:
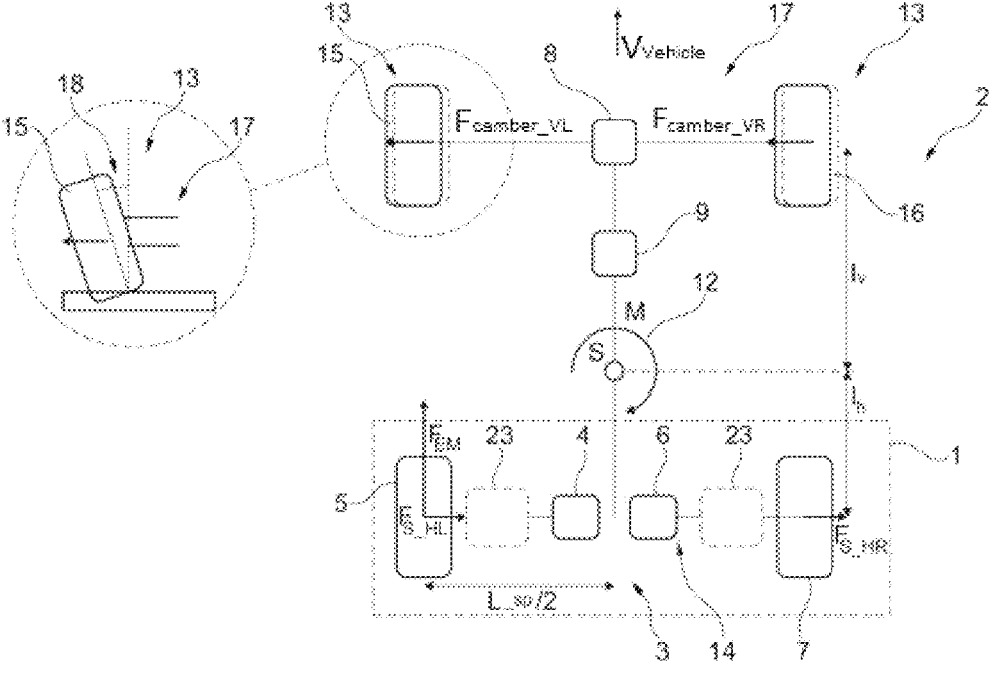
FIG. 5 shows a fifth embodiment of an electrically operable axle drive train in a schematic block diagram.
Figure 6:
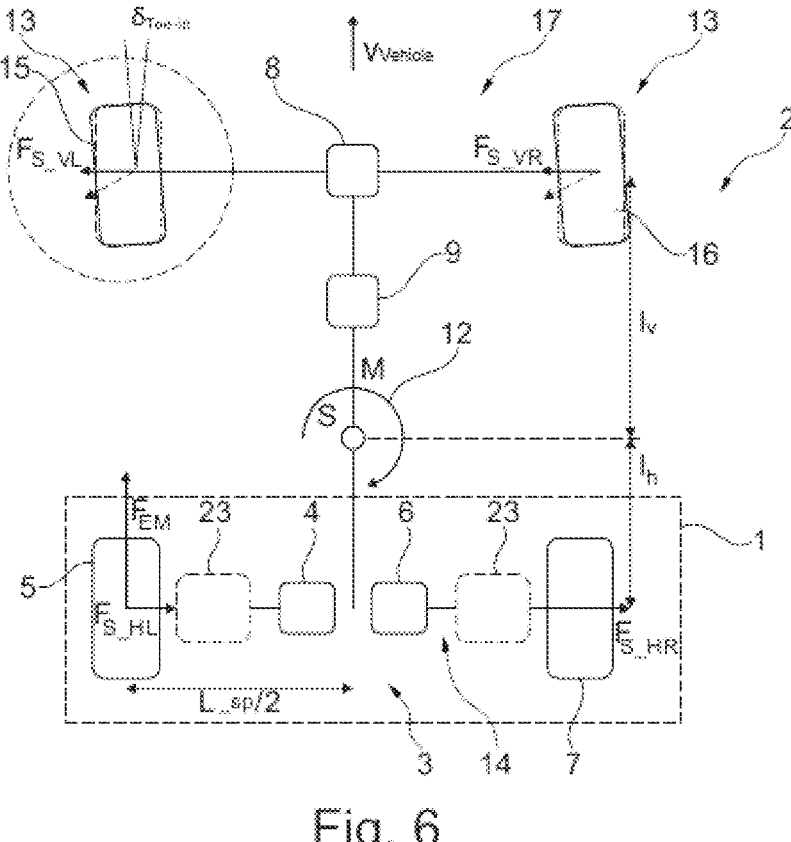
FIG. 6 shows a sixth embodiment of an electrically operable axle drive train in a schematic block diagram.

The following variants, which are shown in FIGS. 5-6, offer advantages for motor vehicles 2 that already have active chassis elements in their steering system 8 which, for example, enable active adjustment of the camber or toe-in while driving.

FIG. 5 shows an embodiment in which the control unit 9 actuates the steering system 8 in such a way that the third vehicle wheel 15 and/or the fourth vehicle wheel 16 of the second vehicle axle 17 can be moved into a steering position 13 which compensates for the torque 12 in that, in the steering position 13, the camber angle 18 of the third vehicle wheel 15 and/or of the fourth vehicle wheel 16 is brought into a camber angle position that counteracts the torque 12.

In this way, the required lateral forces for compensating for the torque 12 can be generated. The camber angle 18 at the right front wheel 15 is increased in the negative direction in the embodiment shown in FIG. 5. At the left front wheel 16, the change would take place in the positive camber direction. The resultant increased cornering forces generate the stabilizing torque via the lever arm to the center of gravity, so counteracting the torque 12.

A further correction option in this context is to adjust the toe-in (toe-in angle), as shown in FIG. 6. Here, the control unit 9 actuates the steering system 8 in such a way that the third vehicle wheel 15 and/or the fourth vehicle wheel 16 of the second vehicle axle 17 can be moved into a steering position 13 which compensates for the torque 12 in that, in the steering position 13, the toe-in angle 19 of the third vehicle wheel 15 and/or of the fourth vehicle wheel 16 is brought into a toe-in angle position that counteracts the torque 12. In the exemplary embodiment of FIG. 6, the right front wheel 16 would be adjusted further in the direction of toe-in (inside of vehicle) and the left front wheel 15 in the direction of toe-out (outside of vehicle).

Figure 7:
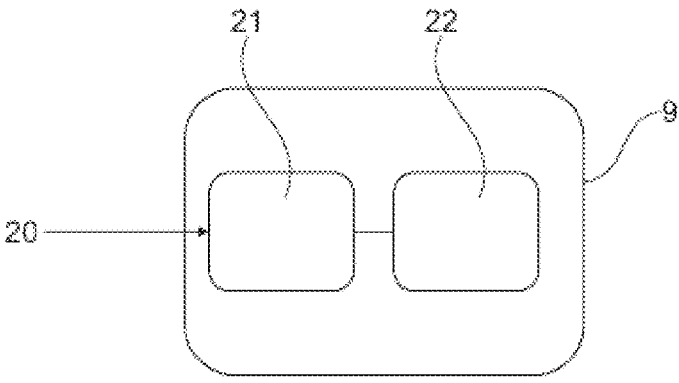
FIG. 7 shows a control unit in a schematic block diagram.

Finally, FIG. 7 shows a control unit 9 for controlling the electrically operable axle drive train 1 for the motor vehicle 2, comprising a processor 21 and a memory 22 which contains a computer program code, the memory 22 and the computer program code being configured, with the processor 21, to cause the control unit 9 to carry out the procedure outlined below.

The method for operating an electrically operable axle drive train 1 for a motor vehicle 2, as already known from FIGS. 1-6, comprises the following steps:

monitoring the function of the electric machines 4,6 and checking whether there is a malfunction in one of the electric machines 4, 6, in which one of the vehicle wheels 5 has a lower speed and/or a lower torque than the respective other vehicle wheel 7, such that a resulting torque 12 acting on the motor vehicle 2 is generated, calculation of a steering position 13 of the steering system 8 that counteracts this torque 12 by the control unit 9, actuation of the steering system 8 into the calculated steering position 13 that counteracts the torque 12.

The present disclosure is not limited to the embodiments shown in the figures. The above description is therefore not to be regarded as limiting, but rather as illustrative. The following claims are to be understood as meaning that a stated feature is present in at least one embodiment of the present disclosure. This does not exclude the presence of further features. Where the claims and the above description define 'first' and 'second' features, this designation serves to distinguish between two features of the same type without defining an order of precedence.

LIST OF REFERENCE SYMBOLS

1 Axle drive train
2 Motor vehicle
3 Vehicle axle
4 Machine
5 Vehicle wheel
6 Machine
7 Vehicle wheel
8 Steering system
9 Control unit
12 Torque
13 Steering position
15 Vehicle wheel
16 Vehicle wheel
17 Vehicle axle
18 Camber angle
19 Toe-in angle
21 Processor
22 Memory
24 Signal
25 Control unit
26 Signal receiver
27 Server

The invention claimed is:

1. An electrically operable axle drive train for a motor vehicle comprising:

a first vehicle axle with a first electric machine configured to drive a first vehicle wheel of the first vehicle axle;

a second electric machine configured to drive a second vehicle wheel of the first vehicle axle;

9 a steering system configured to steer the motor vehicle; and a control unit configured to effect actuation of the steering system, wherein in response to a malfunction of one of the first electric machine or the second electric machine resulting in at least one of a lower speed or a lower torque being applied to one of the vehicle wheels than to the other vehicle wheel, the control unit is configured to actuate the steering system to a steering position that counteracts a resulting torque acting on the motor vehicle that is generated by at least one of the lower speed or the lower torque.

2. The axle drive train according to claim 1, wherein the control unit actuates the steering system in such a way that at least one of a third vehicle wheel or a fourth vehicle wheel of a second vehicle axle is moved into the steering position.

3. The axle drive train according to claim 1, wherein the control unit actuates the steering system in such a way that at least one of the first vehicle wheel or the second vehicle wheel of the first vehicle axle is moved into the steering position.

4. The axle drive train according to claim 2, wherein, in the steering position, a camber angle of the at least one of the third vehicle wheel or the fourth vehicle wheel is brought into a camber angle position that counteracts the resulting torque.

5. The axle drive train according to claim 2, wherein, in the steering position, a toe-in angle of the at least one of the third vehicle wheel or the fourth vehicle wheel is brought into a toe-in angle position that counteracts the resulting torque.

6. The axle drive train according to claim 1, wherein the control unit is configured, in response to the malfunction, to generate a signal representing the malfunction and send the signal to at least one of a higher-level control unit of the motor vehicle or a signal receiver outside the motor vehicle.

7. The axle drive train according to claim 1, wherein the control unit is configured, in response to the malfunction, to at least one of a) store a time at which the malfunction occurred in at least one of the control unit or a higher-level control unit, or b) send a signal representing the time to a signal receiver outside the motor vehicle.

8. A method for operating an electrically operable axle drive train for a motor vehicle, wherein the motor vehicle includes a first vehicle axle with a first electric machine configured to drive a first vehicle wheel of the first vehicle axle and a second electric machine configured to drive a second vehicle wheel of the first vehicle axle, a steering system configured to steer the motor vehicle, and a control unit configured to effect actuation of the steering system, the method comprising:

monitoring a function of the first and second electric machines;

identifying a malfunction in one of the first and second electric machines, based on detecting at least one of a lower speed or a lower torque being applied to one of the vehicle wheels than to the other vehicle wheel, wherein the at least one of the lower speed or the lower torque generates a resulting torque acting on the motor vehicle;

calculating, via the control unit, a steering position of the steering system that counteracts the resulting torque; and actuating the steering system into the calculated steering position that counteracts the resulting torque.

9. The method of claim 8, wherein the control unit comprises a computer program product stored on a non-transitory machine readable medium causing the control unit to monitor the function of the first and second electric machines, identify the malfunction in one of the first and second electric machines, calculate the steering position of the steering system that counteracts the resulting torque, and actuate the steering system into the calculated steering position that counteracts the resulting torque.

10. A control unit configured to control an electrically operable axle drive train for a motor vehicle, the control unit comprising a processor and a non-transitory memory containing a computer program code, wherein the non-transitory memory and the computer program code are configured, with the processor, to:

monitor a function of a first electric machine and a second electric machine in an axle drive train;

identify a malfunction in one of the first and second electric machines based on detecting at least one of a lower speed or a lower torque being applied to a vehicle wheel on a first axle of the axle drive train than a further vehicle wheel on the first axle, wherein the at least one of the lower speed or the lower torque generates a resulting torque acting on the motor vehicle;

calculate, via the control unit, a steering position of a steering system of the axle drive train that counteracts the resulting torque; and actuate the steering system into the calculated steering position that counteracts the resulting torque.

11. The method according to claim 8, wherein actuating the steering system includes actuating at least one of a third vehicle wheel or a fourth vehicle wheel of a second vehicle axle into the steering position.

12. The method according to claim 11, wherein, in the steering position, a camber angle of the at least one of the third vehicle wheel or the fourth vehicle wheel is brought into a camber angle position that counteracts the resulting torque.

13. The method according to claim 11, wherein, in the steering position, a toe-in angle of the at least one of the third vehicle wheel or the fourth vehicle wheel is brought into a toe-in angle position that counteracts the resulting torque.

14. The method according to claim 8, wherein actuating the steering system includes actuating at least one of the first vehicle wheel or the second vehicle wheel into the steering position.

15. The method according to claim 14, wherein actuating the steering system further includes actuating at least one of a third vehicle wheel or a fourth vehicle wheel of a second vehicle axle into the steering position.

16. The control unit according to claim 10, wherein actuating the steering system includes actuating at least one of a third vehicle wheel or a fourth vehicle wheel of a second vehicle axle into the steering position.

17. The control unit according to claim 10, wherein actuating the steering system includes actuating at least one of the vehicle wheel or the further vehicle wheel into the steering position.

18. The control unit according to claim 17, wherein actuating the steering system further includes actuating at least one of a third vehicle wheel or a fourth vehicle wheel of a second vehicle axle into the steering position.

19. The control unit according to claim 18, wherein, in the steering position, a camber angle of the at least one of the third vehicle wheel or the fourth vehicle wheel is brought into a camber angle position that counteracts the resulting torque.

20. The control unit according to claim 18, wherein, in the steering position, a toe-in angle of the at least one of the third vehicle wheel or the fourth vehicle wheel is brought into a toe-in angle position that counteracts the resulting torque.

* * * * *